Figure 1:
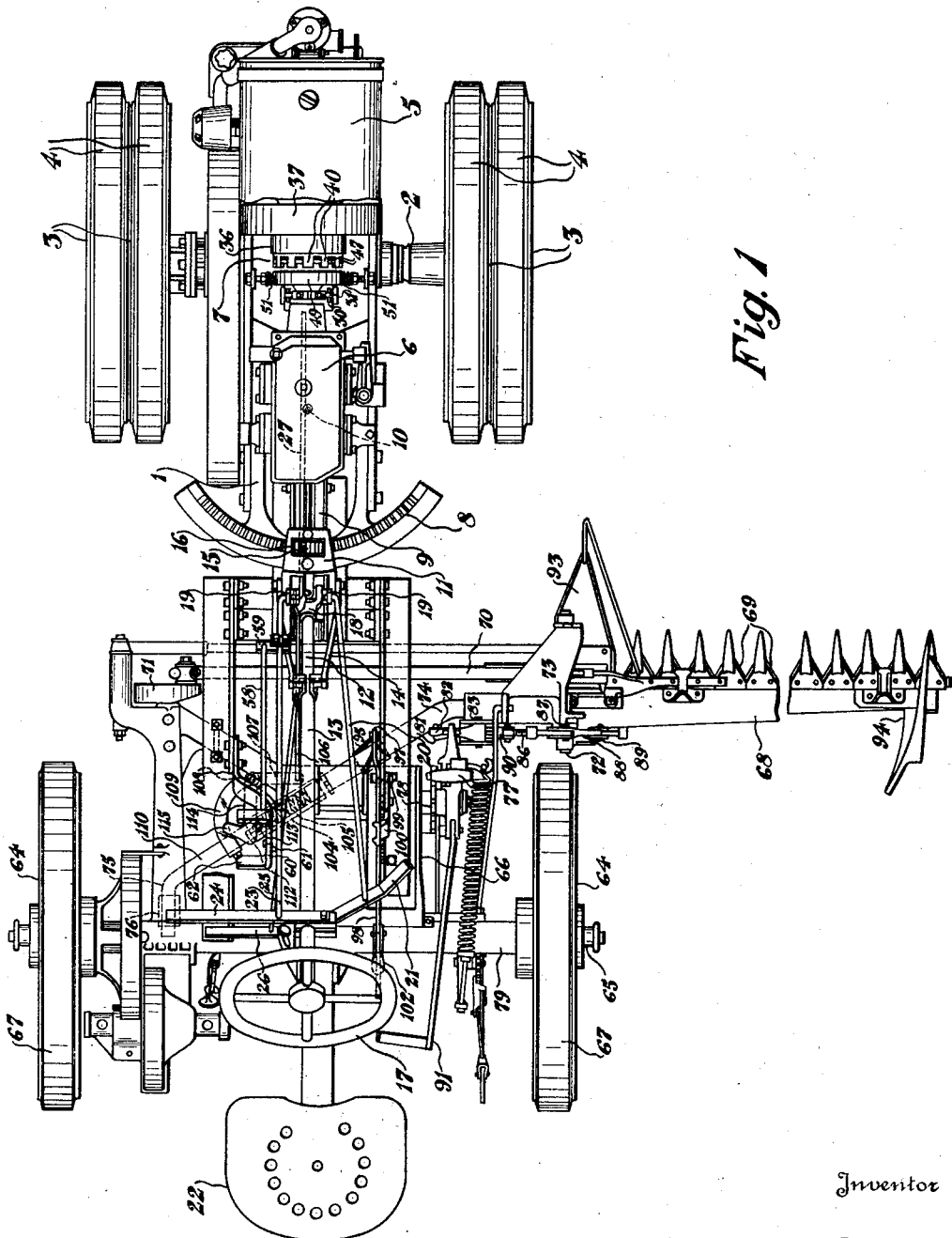

March 15, 1932.     C. W. ARCHER     1,849,264
MOWING MACHINE
Filed Aug. 20, 1928     3 Sheets-Sheet 1

Inventor
Carl W. Archer
By Harry Frease
Attorney

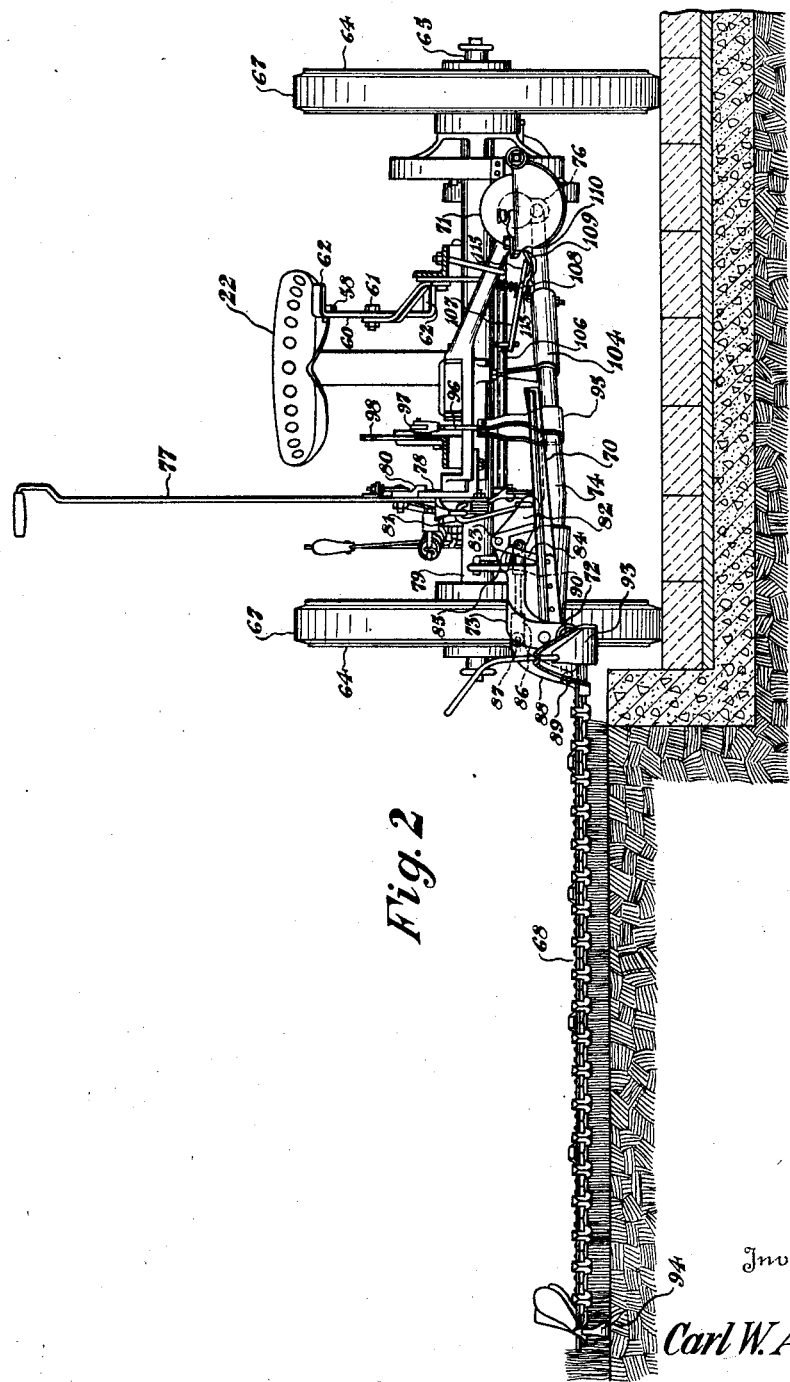

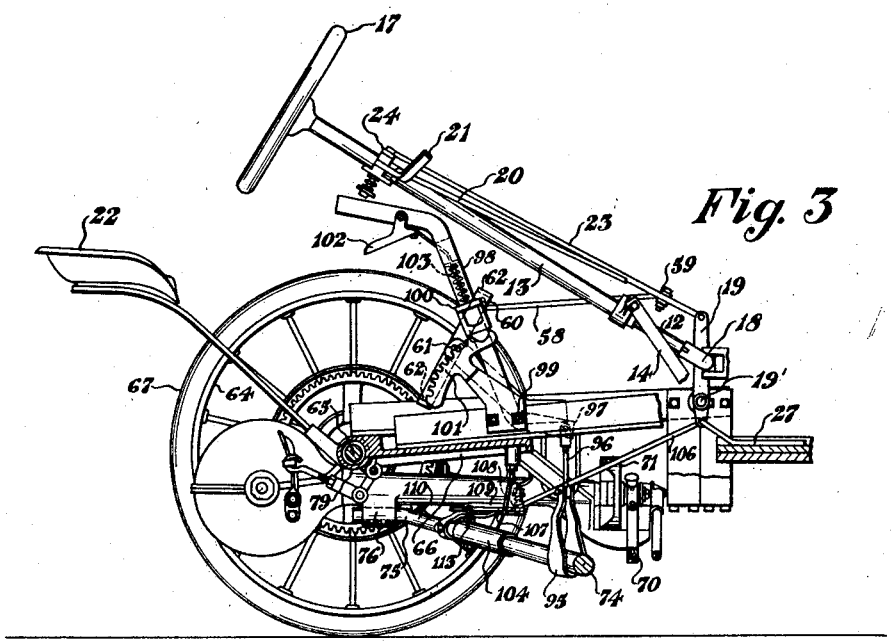

Patented Mar. 15, 1932

1,849,264

UNITED STATES PATENT OFFICE

CARL W. ARCHER, OF MASSILLON, OHIO, ASSIGNOR TO MASSILLON IMPLEMENT COMPANY, OF MASSILLON, OHIO, A CORPORATION OF OHIO

MOWING MACHINE

Application filed August 20, 1928. Serial No. 300,628.

The invention relates to tractor drawn mowing machines, and is more particularly designed for mowing grass along the edges of highways and the like.

It has been found by experience that the types of mowing machines now in general use are not entirely satisfactory or practical for mowing grass along the edges of paved roads.

Such mowing machines are provided with a shoe upon the under side of the cutter bar, adapted to slide upon the surface of the ground as the machine is moved.

This shoe quickly wears out by contact with the gravel along the edge of the road, or with the curb which is used alongside of some roads.

Although the usual type of mowing machine in common use is provided with means for raising the cutter bar into a vertical position, when not in use, no means is provided thereon for adjusting the height of the cutter bar when in the horizontal or operative position.

In cutting the grass at the edges of roadways and the like, it is often desirable to raise the cutter bar, while in horizontal position, in order to hold the shoe out of contact with the gravel or other rough surface at the edge of the road. It is also often necessary to adjust the cutter bar sufficiently high to clear a curb or the like along the edge of the road.

One object of the present improvement is to provide a mowing machine having means for adjusting the cutter bar vertically while in the horizontal or operative position, as well as to swing the same up into vertical position when not in use.

Figure 1 is a plan view of the improved tractor drawn mowing machine, showing the cutter bar in the horizontal or operative position;

Fig. 2, a front elevation of the same;

Fig. 3, a longitudinal section through the mowing machine with the tractor removed.

Similar numerals refer to similar parts throughout the several figures of the drawings.

The tractor, which may be of any desired type, is mounted upon a suitable frame shown generally at 1, and provided with the axle 2 located transversely through the central portion of the frame. Traction wheels 3, preferably of dual type as shown, and provided with rubber tires 4, are fixed upon the axle 2.

The engine shown generally at 5, is operatively connected to the gears in the gear housing 6 through a clutch indicated generally at 7.

A gear segment 8 may be fixed at the rear end of the tractor frame and the drawbar 9, carried by the mowing machine, may be pivotally connected to the tractor frame, concentric with said segment, as by a bolt 10.

This drawbar may be provided with the bracket portion 11 in which is journaled the steering shaft 12, which is journaled in the usual tubular steering column 13 and held in inclined position as by the bracket 14. A pinion 15 is carried by the lower end of the steering shaft, being received within the slot 16 of the bracket 11 and engaging the gear segment 8 whereby turning of the steering wheel 17 will cause the tractor to be turned upon the pivot 10, with reference to the mowing machine.

It should be understood that a universal joint or the like as indicated generally at 18 may be provided in the steering shaft between the pinion 15 and the steering wheel. A series of substantially vertical levers 19 are pivoted, as at 19', upon the frame adjacent to the lower end of the steering shaft.

There are preferably three of these levers to each of which is connected a link leading to an operating lever or the like upon the steering column. The other end of each of these levers is connected by another link to the gear shift, clutch and throttle, respectively, of the tractor.

The gear shift link 20 extends from the upper end of its lever 19 to an operating lever 21 pivotally connected to the upper portion of the steering column in convenient position to be grasped by the operator when sitting in the seat 22.

The clutch link 23 is similarly connected to the upper end of its lever 19 and to an operating lever 24 also mounted upon the steering column in convenient position for the operator. The throttle lever 25 is in the same way connected to its lever 19 and to an operating lever 26 located upon the steering column adjacent to the other operating levers.

As above described, links lead from the lower ends of the levers 19 to the various controls of the tractor. However, as the present invention is not concerned with the operation of the throttle or gear shift, the links connected thereto are not shown.

It should be kept in mind that applicant's invention does not pertain to the specific construction of the tractor as above described as any other form of tractor may be associated with the mowing machine. However, in order to illustrate the invention, the tractor which is now in general use has been illustrated and described merely for the purpose of illustration.

The link 27 leads from the lower ends of the lever 19, to which the clutch link 23 is connected and extends forward for connection to the clutch and brake.

The mower is carried upon the wheels 64 mounted upon the axle 65 which supports the frame indicated generally at 66. The wheels 64 may be provided with rubber tires 67 in order to facilitate the moving of the machine upon a paved road.

The cutter bar 68 of the mowing machine is provided with the usual reciprocating knives 69 adapted to be driven in any usual and well known manner such as the link 70 and eccentric 71 and is extended from one side of the machine in horizontal position above the ground when operating to mow the grass, as shown in Figs. 1 and 2.

This cutter bar is pivotally connected as at 72 to a bracket 73 carried by the supporting bar 74 located diagonally below the frame of the mowing machine and having its other end portion bent at an angle as shown at 75 and located in a depending boss 76 provided upon the frame.

For the purpose of raising the cutter bar into vertical position, when not in use, the usual mechanism may be employed, including the operating lever 77 pivoted to a rack segment 78 mounted upon any stationary portion of the frame such as the axle housing 79 and having the usual pawl 80 for engagement with the rack segment.

The lever 77 is connected by a link 81 with a lever 82 pivoted as at 83 upon a bracket 84. Pivoted to this lever, as at 85, is a link 86 which is in turn connected as at 87 to a second link 88 pivotally connected to the cutter bar as at 89, at a point spaced from the pivotal point 72 thereof.

A lug 90 is formed upon one side of the lever 82 and adapted to engage the upper edge of the link 86. A foot lever 91 may also be connected to the lever 77.

When the lever 77 is pulled backward, through the link 81, the lever 82 will be rocked, pulling the links 86 and 88 inward and swinging the cutter bar 68 upward upon its pivot 72. As the lug 90 engages the link 86 the upward movement of the cutter bar will be continued.

The mechanism above described for swinging the cutter bar from the horizontal to the vertical position is common in mowing machines such as are in general use for working in the fields. These cutter bars are commonly provided with a shoe 93 at the inner end portion of the cutter bar and another shoe 94 at the outer or free end thereof adapted for riding upon the ground when the cutter bar is in the horizontal or operative position.

It has been found by experience that this inner shoe 93 wears out in a few miles of use when the mowing machine is used for cutting grass along the side of a paved road or the like, since this shoe rides upon the gravel or curb at the edge of the road.

One of the features of the present invention is to provide means for adjusting the height of the cutter bar vertically toward and away from the ground while maintaining the same in extended horizontal position to raise this inner shoe out of contact with the curb, gravel or other rough surface at the edge of the highway in order to prevent wear upon the shoe.

This means may comprise a stirrup 95 in which the diagonal bar 74 is hung, the stirrup being suspended as by a link 96, from the lower end 97 of a bar raising lever 98 fulcrumed as at 99 upon the frame.

This lever may be provided with a spring pressed pawl 100 adapted to engage the notches in the rack segment 101 which is fixed upon the frame adjacent thereto. The usual hand lever 102 may be provided for pulling the pawl out of engagement with the rack segment, against the pressure of the spring 103.

With this construction, it will be seen that the lever 98 may be swung to any desired position to raise the diagonal bar 74, and with it the cutter bar 68, to the desired height, the pawl upon the lever being engaged with the rack segment to hold the cutter bar at this height, in horizontal position with the shoe raised above the curb or rough surface along the edge of the road as shown in Fig. 2.

In order to provide for automatically stopping the machine without injury to the same, in the event the cutter bar strikes an obstacle, the diagonal bar 74 may be formed of two sections telescoped within a sleeve 104 and normally held apart as by the spring 105.

A link 106 is connected to the same lever 19 to which the clutch and brake control link 23 is attached and at its other end is connected to a bell crank lever 107 journaled as at 108 upon the beveled segment 109 which is fixed upon the shorter section 110 of the diagonal bar.

The sleeve 104 is fixed to the longer section of the bar 74 as by a pin 111 and is slidable upon the shorter section which is provided with a slot 112 which slidably receives the stud or bolt 113 carried by the sleeve.

The other arm 114 of the bell crank lever normally contacts with the stud 113 and is provided with a finger 115 riding upon the beveled upper surface of the segment 109.

It will be seen that as the machine is moving forward, if the cutter bar strikes an obstacle, it will cause a telescoping of the diagonal bar 74, the sleeve 104 thereof telescoping upon the shorter section 110. The stud 113, contacting with the bell crank lever, will swing the same upon its fulcrum and through the link 106, lever 19 and link 27, the clutch will be thrown out and the brake applied instantly stopping the machine.

As the finger 115 of the bell crank lever rides over the beveled surface of the segment 109, the arm 114 of the bell crank lever will be raised up above the stud 113, thus releasing the bell crank from contact with said stud whereby the clutch may be again thrown in by operating the hand lever 24.

From the above it will be obvious that the cutter bar may be adjusted vertically and held at any desired height while in horizontal or operative position, the clutch may be thrown out and the brake applied simultaneously to instantly stop the tractor and in the event the cutter bar strikes an obstacle, the machine will be instantly stopped automatically, thus preventing serious damage to the cutter bar or other parts of the machine.

I claim:

1. A mowing machine including a frame, a supporting bar pivotally connected at one end to one side of the frame and extending diagonally across the under side of the frame, a cutter bar mounted upon the other end of the supporting bar and extending laterally from the other side of the frame in a substantially horizontal operative position above the ground, and means operatively connected with the supporting bar intermediate its ends for moving the same for bodily adjusting the cutter bar vertically toward and away from the ground while maintaining the same in extended horizontal position.

2. A mowing machine including a frame, a supporting bar pivotally connected at one end to one side of the frame and extending diagonally across the under side of the frame, a cutter bar mounted upon the other end of the supporting bar and extending laterally from the other side of the frame in a substantially horizontal operative position above the ground, a stirrup on an intermediate portion of the supporting bar, and lever means mounted on the frame and operatively connected to the stirrup for raising and lowering the supporting bar for bodily moving the cutter bar vertically toward and away from the ground while maintaining the same in extended horizontal position.

3. A mowing machine including, a supporting bar having telescoped sections permitting longitudinal contraction of the bar, spring means normally resisting constraction of the bar, a cutter bar mounted upon the supporting bar and extending laterally of the mowing machine in a substantially horizontal operative position, and means associated with the supporting bar for bodily raising and lowering the cutter bar while maintaining the same in horizontal position.

In testimony that I claim the above, I have hereunto subscribed my name.

CARL W. ARCHER.